(12) United States Patent
Thomaschewski (10) Patent No.: US 10,220,949 B2
(45) Date of Patent: Mar. 5, 2019

(54) AIRPLANE SEAT WITH AN ADJUSTABLE DEVICE

(71) Applicant: Lufthansa Technik AG, Hamburg (DE)

(72) Inventor: Oliver Thomaschewski, Norderstedt (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 215 days.

(21) Appl. No.: 14/902,777

(22) PCT Filed: Jun. 26, 2014

(86) PCT No.: PCT/EP2014/063492
§ 371 (c)(1),
(2) Date: Jan. 4, 2016

(87) PCT Pub. No.: WO2015/000782
PCT Pub. Date: Jan. 8, 2015

(65) Prior Publication Data
US 2016/0167788 A1  Jun. 16, 2016

(30) Foreign Application Priority Data
Jul. 3, 2013  (DE) .................. 10 2013 212 976

(51) Int. Cl.
*B64D 11/06* (2006.01)
*B60N 2/22* (2006.01)
(Continued)

(52) U.S. Cl.
CPC ...... *B64D 11/06395* (2014.12); *B60N 2/1665* (2013.01); *B60N 2/22* (2013.01);
(Continued)

(58) Field of Classification Search
CPC .......... B60N 2/22; B60N 2/4495; B60N 2/46; B60N 2/4633; B60N 2/4693;
(Continued)

(56) References Cited

U.S. PATENT DOCUMENTS 6,441,576 B1 * 8/2002 Marin-Martinod ................ B60N 2/0232
318/568.1
6,902,238 B1   6/2005 Abt et al.
(Continued)

FOREIGN PATENT DOCUMENTS

EP  2 602 189 A1  6/2013
JP  2003299545 A * 10/2003 ............... B60N 2/22
(Continued)

OTHER PUBLICATIONS

First Examination Report dated Mar. 28, 2014, for German Patent Application No. 10 2013 212 976.9.

*Primary Examiner* — Ryan D Kwiecinski
(74) *Attorney, Agent, or Firm* — Saliwanchik, Lloyd & Eisenschenk (57) ABSTRACT

The invention relates to an aircraft seat comprising an adjusting device, the aircraft seat comprising at least one adjustable seat element. The seat element has an adjustable state and a locked state, the seat element being adjustable by means of manual force application and/or force application by a spring element and/or force application due to the weight of parts of the aircraft seat only in the adjustable state. The adjusting device comprises at least one control element and at least one locking element, the locking element being movable by means of the control element between a locking position in which the seat element is locked, and a neutral position in which the seat element is adjustable. The control element is an electronic and/or electric switch, and the locking element can be moved (Continued)

between the locking position and the neutral position by means of an electrically operated actuator which can be actuated by means of signals from the switch.

21 Claims, 3 Drawing Sheets

(51) Int. Cl.
    *B60N 2/75*                (2018.01)
    *B60N 2/16*                (2006.01)
    *B60N 2/90*                (2018.01)

(52) U.S. Cl.
    CPC ............... *B60N 2/75* (2018.02); *B60N 2/797* (2018.02); *B60N 2/995* (2018.02); *B64D 11/064* (2014.12); *B64D 11/0642* (2014.12); *B64D 11/0643* (2014.12); *B64D 11/0644* (2014.12)

(58) Field of Classification Search
    CPC ............... B60N 2/4814; B60N 2/4844; B60N 2002/4455; B64D 11/0639; B64D 11/064; B64D 11/0642; B64D 11/0643; B64D 11/0644
    See application file for complete search history.

(56) References Cited

U.S. PATENT DOCUMENTS

| | | | |
|---|---|---|---|
| 7,546,215 B2* | 6/2009 | Muhammad | B64D 11/06 702/94 |
| 2002/0105212 A1* | 8/2002 | Nivet | B60N 2/0224 297/83 |
| 2002/0113478 A1* | 8/2002 | Kasahara | B64D 11/0641 297/362.11 |
| 2006/0103212 A1 | 5/2006 | Waligora et al. | |
| 2008/0009989 A1* | 1/2008 | Kim | B60N 2/0232 701/36 |
| 2009/0218859 A1* | 9/2009 | Lawall | B60N 2/42763 297/216.1 |
| 2010/0031761 A1 | 2/2010 | Daul | |
| 2011/0254705 A1* | 10/2011 | Hashberger | B64D 11/003 340/945 |
| 2011/0282495 A1* | 11/2011 | Fischer | B60N 2/0224 700/275 |
| 2014/0001802 A1* | 1/2014 | Piaulet | B60N 2/002 297/217.2 |

FOREIGN PATENT DOCUMENTS

| WO | WO 02/16161 A1 | 2/2002 |
|---|---|---|
| WO | WO 2008/073028 A1 | 6/2008 |

\* cited by examiner

AIRPLANE SEAT WITH AN ADJUSTABLE DEVICE

CROSS REFERENCE TO A RELATED APPLICATION

This application is a National Stage Application of International Application Number PCT/EP2014/063492, filed Jun. 26, 2014; which claims priority to German Patent Application No 10 2013 212 976.9, filed Jul. 3, 2013; both of which are incorporated herein by reference in their entirety.

FIELD OF INVENTION

The invention relates to an aircraft seat comprising an adjusting device, the aircraft seat comprising at least one adjustable seat element. The seat element has an adjustable state and a locked state, the seat element being adjustable by means of manual force application and/or force application by a spring element and/or force application due to the weight of parts of the aircraft seat only in the adjustable state. The adjusting device comprises at least one control element and at least one locking element. The locking element can be moved by means of the control element between a locking position in which the seat element is locked, and a neutral position in which the seat element is adjustable.

BACKGROUND

Aircraft seats comprising adjustable seat elements, such as backrests, arm rests, leg rests or seat surfaces are generally known. The adjustment is a relative change in the position and/or orientation of two or more seat elements. This can include, for example, setting the angle of a backrest relative to a seat surface or adjusting the height of the leg rest relative to the seat surface. A seat element can be adjusted relative to a further seat element by means of rotation about an axis, by means of displacement along an axis, or by means of adjustment along a trajectory. Moreover, seat elements, in particular the seat surface, are adjusted relative to a seat base or a seat frame which is fixed to the cabin floor.

The adjustment of seat elements is made possible by means of adjusting devices, which allow two or more seat elements of an aircraft seat to move relative to one another within specified limits.

Aircraft seats providing a normal level of comfort, which are provided for as dense a seat arrangement as possible in an aircraft, usually comprise mechanical adjusting devices for seat elements, which a seat occupant can release from a locked position by means of an operating lever or operating button. The operating lever is connected to the adjusting device and to a corresponding locking element by means of cables, rods or hydraulic lines for mechanical transmission of the unlocking force.

The mechanical transmission of the unlocking force in order to allow a corresponding force transmission from the operating lever to the adjusting device has a complex configuration on account of the distance to be bridged between an operating lever, e.g. at the end of an armrest, and an adjusting device, e.g. on the joint between the seat surface and the backrest. Moreover, possible transitions between seat elements and changes of direction in the case of force transmission in small radii, e.g. at the transition from an armrest to a backrest, must be bridged. Transitions of this kind can in addition be in the form of a joint, as a result of which the mechanical force transmission must occur in an equally complex articulated manner and occupies a correspondingly large amount of space, considerably limiting the design freedom of the aircraft seats. Moreover, mechanisms of this kind can be subject to considerable friction, meaning that they are difficult for an operator to operate, in particular after a long service life. Bowden cables or hydraulic systems, for example, can be used for the purpose of mechanical force transmission.

In contrast, aircraft seats exist which comprise electrically driven adjusting devices. Said devices make it possible for seat elements to be adjusted by means of actuating drives. The actuating drives are electronically activated and can be controlled by a seat occupant by means of control keys. In this way, the angle of a backrest to a seat surface can be adjusted or changed electrically for example. The actuating drives are designed such that one or more seat elements can also be adjusted against the weight of a seat occupant. Moreover, the actuating drives must be designed in such a way that they are able to safely withstand the loads which occur in the event of a crash. On account of these requirements, the servomotors are heavy and also expensive. In addition, the necessary size of the servomotors limits the design freedom of an aircraft seat during integration. If a plurality of adjustable seat elements are provided on an aircraft seat, it must be laboriously ensured that no combination of positions of the seat elements can be reached which could trap or injure a seat occupant.

The object of the invention is to provide an adjusting device for an aircraft seat which overcomes the above-mentioned disadvantages.

BRIEF SUMMARY OF THE INVENTION

The object of the invention is achieved by providing an aircraft seat is comprising an adjusting device, the aircraft seat comprising at least one adjustable seat element. The seat element has an adjustable state and a locked state, the seat element being adjustable by means of manual force application and/or force application by a spring element and/or force application due to the weight of parts of the aircraft seat only in the adjustable state. The adjusting device comprises at least one control element and at least one locking element. The locking element can be moved by means of the control element between a locking position in which the seat element is locked, and a neutral position in which the seat element is adjustable. According to the invention, the control element is an electronic and/or electric switch, and the locking element can be moved between the locking position and the neutral position by means of an electrically operated actuator which can be actuated by means of signals from the switch.

The forces required by the actuator for moving the locking device are significantly lower than the forces required by an actuating drive as known from electrically adjustable aircraft seats, since the actuator does not adjust the seat element but rather is provided simply in order to unlock the locking element. The seat elements are adjusted by the passenger himself or by means of passive spring elements such as gas pressure springs, pressure accumulators, spiral springs or in general by means of mechanical elements having a corresponding restoring force, which can be easily overridden or overcome by a passenger. As a result, the actuator can be configured so as to be very lightweight and small, which has a positive impact on integration into an aircraft seat and the overall weight of said seat. Identical actuators can be used on a plurality of seat elements, since the requirement for the actuating force and actuation path is independent of the design and size of the associated adjustable seat element. In addition to an advantage in terms of cost, the use of a plurality of identical actuators also has the advantage of simplified approval.

An electronic or electric switch can be configured so as to be small and lightweight, with the result that a switch of this kind can be arranged in a more flexible manner in a plurality of assembly positions on an aircraft seat. In order to connect the switch to other components of the adjusting device, only a cable connection for transmitting electrical control signals is required, with the result that significant advantages are achieved in terms of weight and space compared with mechanical transmission paths of an operating lever. The actuator can thus be activated via the cable connection by means of a signal from the switch. In possible embodiments, the signal can also be transmitted wirelessly, at least in part.

In further possible embodiments, in addition to a direct mechanical connection to the locking element, the actuator can also be connected to the locking element by means of mechanical force transmission, it being possible for the distance between the actuator and the locking element to be significantly shorter than that between an operating lever and a locking element. The actuator can be arranged directly on the locking element or so as to be integrated in a seat element in the vicinity thereof, for example.

However, in contrast to the generally known electrical adjusting devices comprising large servomotors, the actuator does not make any adjustments to seat elements. Rather, the actuator permits movement of the locking element, as a result of which a seat element can be adjusted by a seated passenger himself. In this case, adjustment in one direction is preferably brought about by a spring element in such a way that the aircraft seat automatically moves from specific positions into a basic position when the locking element is in the neutral position. Movement in the opposite direction can be achieved by the body of the passenger. The passenger can move and correspondingly adjust the seat elements by applying force to specific seat elements of the aircraft seat, for example by pushing, pulling or weight transfer. The application of force by the passenger preferably occurs counter to the application of force of a spring element, with the result that the passenger himself overrides the spring element. In further embodiments, however, the use of a spring element can also be omitted. After an adjustment of one or more seat elements, the actuator can move the locking element back into a locking position, with the result that the adjusted orientation is maintained even without any action by the passenger.

The use of locking elements which can lock the kinematic movability or adjustability of seat elements in a targeted manner, and the use of electronically operated actuators which can be controlled by switches which can be arranged in a flexible manner, make a particularly lightweight aircraft seat possible. The actuators for moving the locking element can be configured so as to be comparatively small, since they do not carry out the adjustment of the seat element and no loads are introduced to the actuator by the seat element in the event of a crash. Rather, the corresponding loads are borne by the corresponding locking element which, for example in the form of a solid metal part, can withstand loads of this kind.

It is thus possible to omit detailed and certifiably safe programming of movement paths, as well as proof of safety of the movement paths, since the passenger adjusts seat elements manually and therefore cannot become trapped in the aircraft seat due to a possible unfavourable combination of settings of the seat elements. The spring elements are preferably designed in such a way that the forces introduced by a seat element into a seated passenger are smaller than said passenger's typical manual force which he can exert on a seat element when in a seated position.

In the neutral position of the locking element, the adjustability of a corresponding seat element is such that the seat element can be moved in accordance with a specified kinematics of a joint and along a rail. Gas pressure springs, for example, can be used as spring element in the aircraft seat. Switch elements can also be provided which, when briefly activated, permanently release one or more seat elements until activated again.

The adjusting device preferably comprises an override mechanism, the override mechanism permitting manual movement of the locking element between the locking position and the neutral position.

An override mechanism is advantageous in order to make it possible for a safe seat position to be assumed in the event of the failure of one or more actuators or of the power supply to an aircraft seat. The adjusting device thus has a purely mechanical redundancy, as a result of which it can be ensured that the aircraft seat can always be brought into a safety position for critical phases of an aircraft such as take-off, landing or taxiing on the ground. Therefore, in advantageous embodiments, the override mechanism can make it possible for the locking element to be switched between the locking position and the neutral position, irrespective of whether or not the corresponding actuator is operable.

In advantageous embodiments, the override mechanism comprises a manual control device at a distance of less than 15 cm from an effective region of the locking element.

The arrangement in the direct vicinity of the locking element makes short mechanical transmission paths possible, as a result of which the override mechanism can be small, lightweight and without complex deflection mechanisms. Moreover, the relation to the corresponding joint makes it possible for an operator to easily find the corresponding control device on the aircraft seat. The ergonomic disadvantages occurring during operation, which usually prevent an arrangement of this kind, are intentionally accepted in this case, since this is primarily an emergency function. It may be possible, for example, for the manual control device to be triggered by the cabin crew using the override mechanism if a seated passenger cannot achieve the corresponding manual access himself without standing up.

An effective region is to be considered to be a region in which a locking element can exert a locking effect or force. This can comprise, for example, an interlocking connection and/or an engagement in order to prevent the relative movement of two bodies. Moreover, frictional connections can be considered to be effective regions of a locking element, it being possible for the interlocking and/or frictional connection to be released by moving the locking element into a neutral position.

Advantageously, the locking element is configured so as to move automatically into the locking position in the event of failure of an electrical supply to the electrically operated actuator.

The locking element advantageously has a basic position, in which it locks the movability of an associated seat element. The electrically operated actuator can move the locking element counter to a spring tension which can be provided by a corresponding spring into the neutral position, as a result of which it is possible to move the seat element. If the actuator fails on account of damage or an inadequate supply of power, the locking element is automatically moved into the locking position by means of the spring tension, which is advantageous in terms of safety. Moreover, energy-saving operation of the adjusting device in a typically locked seat position can be made possible in an arrangement of this kind.

In advantageous embodiments, a locking element can be controlled, alternatively or in parallel, by a plurality of control elements.

A plurality of control elements can be arranged on the aircraft seat, which elements can control the same locking element. In this way, for example the movability of the backrest as a seat element of an aircraft seat can be controlled at various control elements or switches. A person can thus use one control element when in a seated position and a different control element when in a lying position.

Preferably, a plurality of locking elements can be controlled in parallel or alternatively by one control element. Activating a plurality of locking elements in parallel, by means of the electrically operated actuators, makes it possible to adjust a plurality of seat elements of an aircraft seat in various combinations. For example, by means of actuating one control element, the locking elements for a leg rest and a backrest can be activated in parallel, meaning that a lying seat position can be assumed in a simple manner by actuating one activation element. Optionally, in advantageous embodiments, further control elements can release the movability of the leg rest and the backrest separately.

Preferably, the adjusting device comprises a control panel which comprises a plurality of control elements. This makes it possible to combine the seat control for all the adjusting devices of the aircraft seat. Touch-sensitive screens can also be used as electronic switches of the control elements.

In advantageous embodiments, the control element is arranged in an armrest of the aircraft seat. This makes easy access possible for an operator, which is in addition in his field of vision.

In preferred embodiments, the adjustable seat element is a backrest, leg rest, headrest, armrest and/or seat surface.

In the following, the invention will be described in more detail on the basis of embodiments with reference to the accompanying drawings.

DETAILED DESCRIPTION

Figure 1:
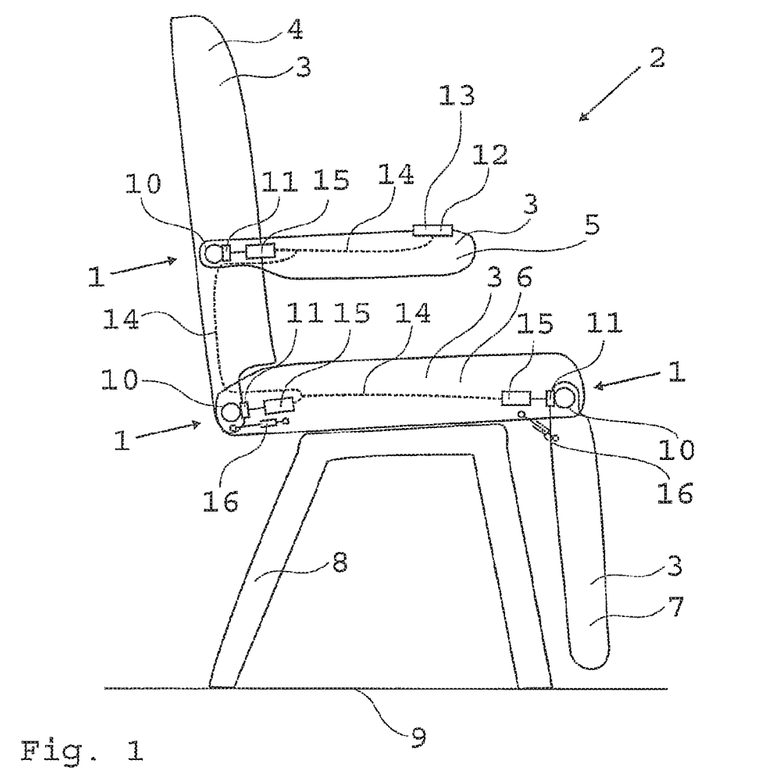
FIG. 1 shows an aircraft seat comprising adjusting devices.

FIG. 1 shows an aircraft seat 2 comprising a backrest 4, an armrest 5, a seat surface 6 and a leg rest 7 as seat elements 3. The aircraft seat 2 is fixed to the cabin floor 9 of an aircraft by means of a frame 8. In this embodiment, three adjusting devices 1 are integrated in the aircraft seat 2, which devices make it possible to adjust the armrest 5 relative to the backrest 4, the backrest 4 relative to the seat surface 6 and the leg rest 7 relative to the seat surface 6.

In this embodiment, the seat elements 3 are adjusted only with respect to the angle of the seat elements 3 to one another, other adjustment options also being possible in general, such as a displacement. Corresponding rotatable joints 10 are provided for the purpose of adjustment. The joints 10 are locked by locking elements 11 in a basic position, which locking elements lock the adjustment, relative movement and movability of the corresponding seat element 3.

The aircraft seat 2 comprises a control panel 12 having a plurality of control elements 13, which is arranged on the armrest 5 in this embodiment. The control panel 12 can be a touch-sensitive screen for example, on which one or more control elements 13 are displayed and can be activated by an operator. The control elements 13 can also be individual mechanically actuatable switches, which can switch an electrical signal.

The control panel 12 is connected to the electrically operated actuators 15 by means of electric cables 14, which actuators are mechanically connected to the corresponding locking elements 11.

The locking element 11 can be pressed into a corresponding catch in the joint 10 for example, in such a way that the locking element 11 prevents the movability and function of the joint 10. The actuator 15 can draw the locking element 11 out of this position locking the joint 10 and into a neutral position, counter to the spring tension of a spring (not shown in the embodiment).

The actuator 15 can be controlled by means of a control element 13. Thus, in different operating modes, the control element 13 can continuously control a neutral position, continuously control a locked position or control a locking or neutral position of the locking element 11 only for the duration of the actuation. The control element 13 is an electric and/or electronic switch which controls at least one actuator 15. Different combinations of positions of the locking elements 11 can be controlled by physically implementing electrical connections and/or by means of a software-supported control unit.

For example, an operator can actuate a control element 13 which controls an actuator 15 for the duration of the actuation. Said actuator 15 moves the locking element 11 into a neutral position, as a result of which for example the movability of the backrest 4 as the adjustable seat element 3 can be made possible relative to the seat surface 6.

A spring element 16, in this advantageous embodiment a gas pressure spring, is arranged on the adjusting device 1 between the backrest 4 and the seat surface 6, which spring element presses the backrest 4 into an upright sitting position in the adjustable state. The backrest 4 can thus automatically assume an upright position in the event of activation of the control element 13, or can be moved backwards into a lying position by means of a seated passenger applying force counter to the spring element 16. An aircraft seat 2 of this kind is advantageous in particular for fitting out a VIP cabin of an aircraft. The aircraft seat 2 can therefore also be used as a VIP seat.

Figure 2:
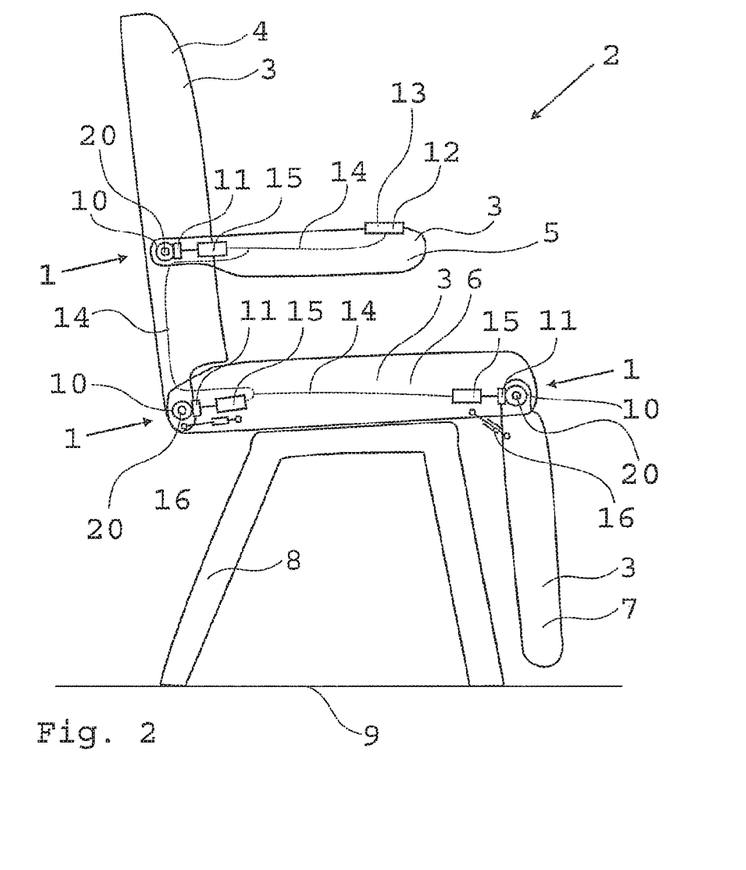
FIG. 2 shows an aircraft seat comprising an override mechanism.

FIG. 2 shows an embodiment of an aircraft seat 2 which comprises an additional manual control device 20 compared with the previous embodiment. The manual control device 20 makes it possible for an operator to use an override mechanism (not shown in the figures). This makes it possible to switch between a locking position and a neutral position of the locking element 11, irrespective of whether or not the corresponding actuator 15 is operable. In this advantageous embodiment, the manual control device 20 is arranged directly on the joint 10. In advantageous embodiments, the manual control device 20 is arranged in the direct vicinity of the locking element 11, meaning that the override mechanism can be configured so as to be small and lightweight. In this embodiment, the manual control devices 20 cannot be optimally reached by a seated operator, but do make it possible to adjust the aircraft seat 2 at any time into a safe and defined sitting position, which needs to be set for critical flight phases such as take-off, landing and taxiing.

Figure 3:
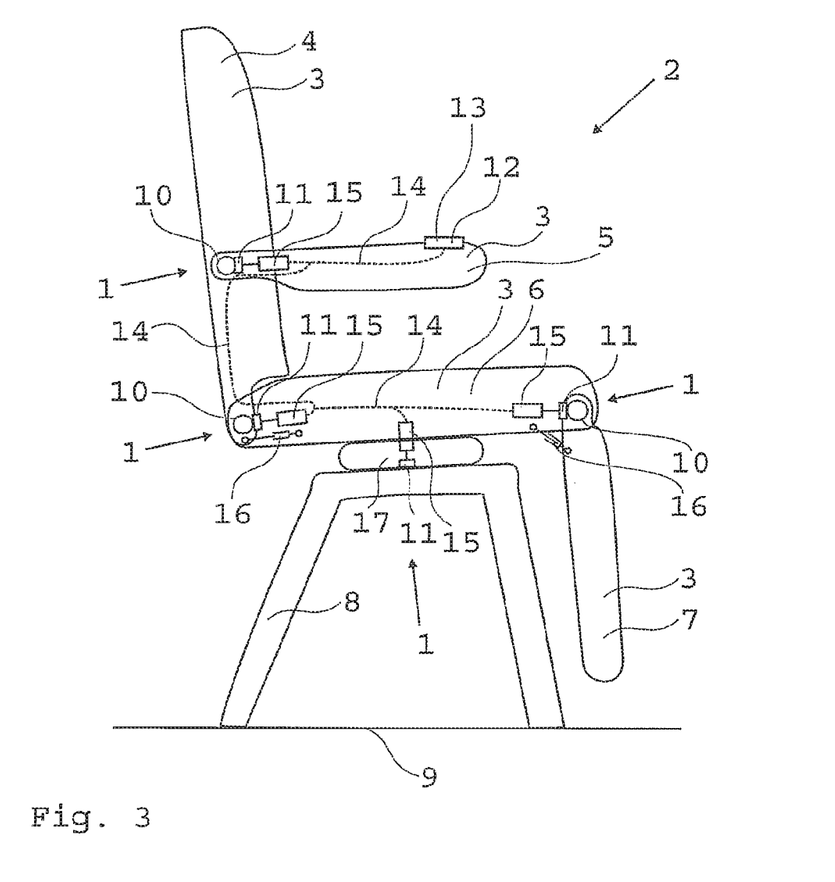
FIG. 3 shows an aircraft seat comprising further adjusting devices.

FIG. 3 shows an advantageous embodiment in which a further adjusting device 1 is arranged as an adjustable seat element 3 between the frame 8 of the aircraft seat 2 and the seat surface 6. The adjusting device 1 comprises a slide rail 17 on which the seat surface 6 can be moved in translation relative to the frame 8. The movability can be locked by a locking element 11, a further, preferably identical, electrically driven actuator 15 in turn being provided, which actuator can move the locking element 11 between a locking position and a neutral position. In addition to the translational movability and/or adjustability, more complex kinematics or movement paths for adjustment between two or more seat elements 3 can also be provided.

In possible embodiments, the movement of the locking element 11 can be electronically or electrically blocked, centrally in the aircraft for a plurality of seats, in a neutral position after a basic position of the aircraft seat 2 has been assumed.

Embodiments

Embodiment 1. Aircraft seat (2) comprising an adjusting device (1), the aircraft seat (2) comprising at least one adjustable seat element (3),
  the seat element (3) having an adjustable state and a locked state,
  the seat element (3) being adjustable by means of manual force application and/or force application by a spring element (16) and/or force application due to the weight of parts of the aircraft seat (2) only in the adjustable state,
  the adjusting device (1) comprising at least one control element (13) and at least one locking element (11),
  the locking element (11) being movable by means of the control element (13) between a locking position in which the seat element (3) is locked, and a neutral position in which the seat element (3) is adjustable, characterized in that
  the control element (13) is an electronic and/or electric switch, and
  the locking element (11) can be moved between the locking position and the neutral position by means of an electrically operated actuator (15) which can be actuated by means of signals from the switch.

Embodiment 2. Aircraft seat (2) according to Embodiment 1, characterized in that the adjusting device (1) comprises an override mechanism, the override mechanism permitting manual movement of the locking element (11) between the locking position and the neutral position.

Embodiment 3. Aircraft seat (2) according to Embodiment 2, characterized in that the override mechanism comprises a manual control device (20) at a distance of less than 15 cm from an effective region of the locking element (11).

Embodiment 4. Aircraft seat (2) according to any of the preceding Embodiments, characterized in that a locking element (11) is configured so as to move automatically into the locking position in the event of failure of an electrical supply to the electrically operated actuator (15).

Embodiment 5. Aircraft seat (2) according to any of the preceding Embodiments, characterized in that a locking element (11) can be controlled, alternatively or in parallel, by a plurality of control elements (13).

Embodiment 6. Aircraft seat (2) according to any of the preceding Embodiments, characterized in that a plurality of locking elements (11) can be controlled in parallel or alternatively by means of one control element (13).

Embodiment 7. Aircraft seat (2) according to any of the preceding Embodiments, characterized in that the adjusting device (1) comprises a control panel (12) which comprises a plurality of control elements (13).

Embodiment 8. Aircraft seat (2) according to any of the preceding claims, characterized in that the control element (13) is arranged in an armrest (5) of the aircraft seat (2).

The invention claimed is:

1. An aircraft seat, comprising:
   at least one adjustable seat element,
   wherein each adjustable seat element of the at least one adjustable seat element has an adjustable state and a locked state;
   a corresponding at least one adjusting device,
   wherein each adjusting device of the at least one adjusting device corresponds to a corresponding adjustable seat element of the at least one adjustable seat element; and
   one or more control elements,
   wherein each control element of the one or more control elements is:
     an electronic switch;
     an electric switch; or
     an electronic and electric switch,
   wherein when each adjustable seat element of the at least one adjustable seat element is in the adjustable state, each adjustable seat element of the at least one adjustable seat element is adjustable by:
     (a) application of an external mechanical force to each adjustable seat element of the at least one adjustable seat element;
     (b) application of a spring force to each adjustable seat element of the at least one adjustable seat element by a spring element;
     (c) application of a weight force to each adjustable seat element of the at least one adjustable seat element due to the weight of at least a portion of the aircraft seat;
     (a) and (b);
     (a) and (c);
     (b) and (c); or
     (a), (b), and (c),
   wherein when each adjustable seat element of the at least one adjustable seat element is in the locked state, each adjustable seat element of the at least one adjustable seat element is not adjustable,
   wherein each adjusting device of the at least one adjusting device comprises:
     a locking element; and
     an electrically operated actuator,
     wherein the locking element is movable via the electrically operated actuator:
       (i) from a locking position to a neutral position; or
       (ii) from a locking position to a neutral position, and from the neutral position to the locking position,
     wherein each control element of at least one control element of the one or more control elements is configured to actuate the electrically operated actuator via a corresponding signal from each control element of at least one control element of the one or more control elements,
   wherein when the locking element of each adjusting device of the at least one adjusting device is in the locking position, the corresponding adjustable seat element of the at least one adjustable seat element is in the locked state, wherein when the locking element of each adjusting device of the at least one adjusting device is in the neutral position, the corresponding adjustable seat element of the at least one adjustable seat element is in the adjustable state,
wherein one or more adjusting devices of the at least one adjusting device comprises:
a corresponding one or more override mechanisms,
wherein each override mechanism of the one or more override mechanisms is configured to permit manual movement of the corresponding locking element from the locking position to the neutral position, and from the neutral position to the locking position, independent of whether the corresponding electrically operated actuator is operable.

2. The aircraft seat according to claim 1,
wherein the one or more override mechanisms comprise:
a corresponding one or more manual control devices,
wherein each manual control device of the one or more manual control devices is positioned at a distance of less than 15 cm from an effective region of the corresponding locking element, and
wherein the effective region is a region where the corresponding locking element can exert a locking effect or force to achieve the locking position.

3. The aircraft seat according to claim 1,
wherein each adjusting device of the at least one adjusting device is configured such that the corresponding locking element automatically moves into the locking position in an event of failure of an electrical supply to the corresponding electrically operated actuator.

4. The aircraft seat according to claim 1,
wherein the at least one control element of the one or more control elements comprise a plurality of control elements of the at least one control element of the one or more control elements,
wherein the plurality of control elements of the at least one control element of the one or more control elements is configured to actuate the electrically operated actuator, sequentially or simultaneously.

5. The aircraft seat according to claim 1,
wherein one control element of the one or more control elements is configured to actuate a plurality of electrically operated actuators of a corresponding plurality of adjusting devices, simultaneously or sequentially.

6. The aircraft seat according to claim 1, further comprising:
a control panel,
wherein the control panel comprises a plurality of control elements of the one of more control elements.

7. The aircraft seat according to claim 1,
wherein at least one control element of the one of more control elements is arranged in an armrest of the aircraft seat.

8. The aircraft seat according to claim 1,
wherein the at least one adjustable seat element comprises one or more adjustable seat elements selected from the group consisting of:
a backrest, a leg rest, a headrest, an armrest, and a seat surface.

9. The aircraft seat according to claim 1,
wherein when each adjustable seat element of the at least one adjustable seat element is in the adjustable state, each adjustable seat element of the at least one adjustable seat element is adjustable by:
(a);
(c); or
(a) and (c).

10. The aircraft seat according to claim 9,
wherein when each adjustable seat element of the at least one adjustable seat element is in the adjustable state, each adjustable seat element of the at least one adjustable seat element is adjustable by:
(a).

11. The aircraft seat according to claim 9,
wherein when each adjustable seat element of the at least one adjustable seat element is in the adjustable state, each adjustable seat element of the at least one adjustable seat element is adjustable by:
(c).

12. The aircraft seat according to claim 9,
wherein when each adjustable seat element of the at least one adjustable seat element is in the adjustable state, each adjustable seat element of the at least one adjustable seat element is adjustable by:
(a) and (c).

13. The aircraft seat according to claim 1,
wherein each locking element is movable via the corresponding electrically operated actuator from the locking position to the neutral position.

14. The aircraft seat according to claim 1,
wherein each locking element is movable via the corresponding electrically operated actuator from the locking position to the neutral position, and from the neutral position to the locking position.

15. The aircraft seat according to claim 1,
wherein when each adjustable seat element of the at least one adjustable seat element is in the adjustable state:
(I) a relative position;
(II) an orientation; or
(III) a relative position and an orientation,
of each adjustable seat element of the at least one adjustable seat element with respect to another adjustable seat element of the at least one adjustable seat element;
(I);
(II); or
(I) and (II),
of each adjustable seat element of the at least one adjustable seat element with respect to a non-adjustable seat element of the aircraft seat; or
(I);
(II); or
(I) and (II),
of each adjustable seat element of the at least one adjustable seat element with respect to a frame of the aircraft seat,
is adjustable by:
(a);
(b);
(c);
(a) and (b);
(a) and (c);
(b) and (c); or
(a), (b), and (c).

16. The aircraft seat according to claim 15,
wherein when each adjustable seat element of the at least one adjustable seat element is in the adjustable state,
(A) a rotation about an axis of each adjustable seat element of the at least one adjustable seat element with respect to another adjustable seat element of the at least one adjustable seat element;
(B) a rotation about an axis of each adjustable seat element of the at least one adjustable seat element with respect to a non-adjustable seat element of the aircraft seat; or (C) a rotation about an axis of each adjustable seat element of the at least one adjustable seat element with respect to a frame of the aircraft seat, is adjustable by:
(a);
(b);
(c);
(a) and (b);
(a) and (c);
(b) and (c); or
(a), (b), and (c).

17. The aircraft seat according to claim 16,
wherein each adjusting device of the at least one adjusting device comprises a corresponding rotatable joint,
wherein when each adjustable seat element of the at least one adjustable seat element is in the adjustable state,
 (A) the rotation about an axis of each adjustable seat element of the at least one adjustable seat element with respect to another adjustable seat element of the at least one adjustable seat element is accomplished via the rotatable joint interconnecting each adjustable seat element of the at least one adjustable seat element with another adjustable seat element of the at least one adjustable seat element,
 (B) the rotation about an axis of each adjustable seat element of the at least one adjustable seat element with respect to a non-adjustable seat element of the aircraft seat is accomplished via the rotatable joint interconnecting each adjustable seat element of the at least one adjustable seat element with the non-adjustable seat element of the aircraft seat, or
 (C) the rotation about an axis of each adjustable seat element of the at least one adjustable seat element with respect to a frame of the aircraft seat is accomplished via the rotatable joint interconnecting each adjustable seat element of the at least one adjustable seat element with the frame of the aircraft seat.

18. The aircraft seat according to claim 15,
wherein when each adjustable seat element of the at least one adjustable seat element is in the adjustable state,
 (A) a translation of each adjustable seat element of the at least one adjustable seat element with respect to another adjustable seat element of the at least one adjustable seat element;
 (B) a translation of each adjustable seat element of the at least one adjustable seat element with respect to a non-adjustable seat element of the aircraft seat; or
 (C) a translation of each adjustable seat element of the at least one adjustable seat element with respect to a frame of the aircraft seat, is adjustable by:
(a);
(b);
(c);
(a) and (b);
(a) and (c);
(b) and (c); or
(a), (b), and (c).

19. The aircraft seat according to claim 15,
wherein each adjusting device of the at least one adjusting device comprises a corresponding slide rail,
wherein when each adjustable seat element of the at least one adjustable seat element is in the adjustable state,
 (A) the translation of each adjustable seat element of the at least one adjustable seat element with respect to another adjustable seat element of the at least one adjustable seat element is accomplished via the slide rail interconnecting each adjustable seat element of the at least one adjustable seat element with another adjustable seat element of the at least one adjustable seat element,
 (B) the translation of each adjustable seat element of the at least one adjustable seat element with respect to a non-adjustable seat element of the aircraft seat is accomplished via the slide rail interconnecting each adjustable seat element of the at least one adjustable seat element with the non-adjustable seat element of the aircraft seat, or
 (C) the translation of each adjustable seat element of the at least one adjustable seat element with respect to a frame of the aircraft seat is accomplished via the slide rail interconnecting each adjustable seat element of the at least one adjustable seat element with the frame of the aircraft seat.

20. The aircraft seat according to claim 1,
wherein the spring element is selected form the group consisting of:
 a gas pressure spring, a pressure accumulator, a spiral spring a mechanical element having a corresponding restoring force.

21. The aircraft seat according to claim 1,
wherein the signal from the control element of at least one control element of the one or more control elements is transmitted to the electrically operated actuator via a cable.

* * * * *